Feb. 19, 1935. J. L. TAYLOR 1,991,640
FRUIT CURTAIN
Filed July 3, 1933
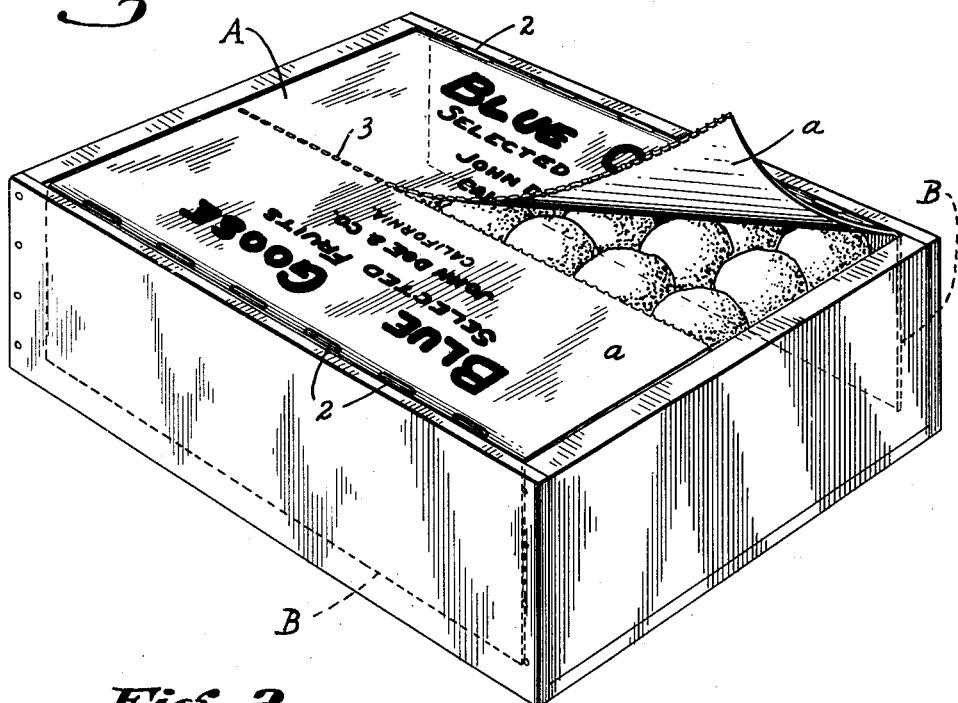
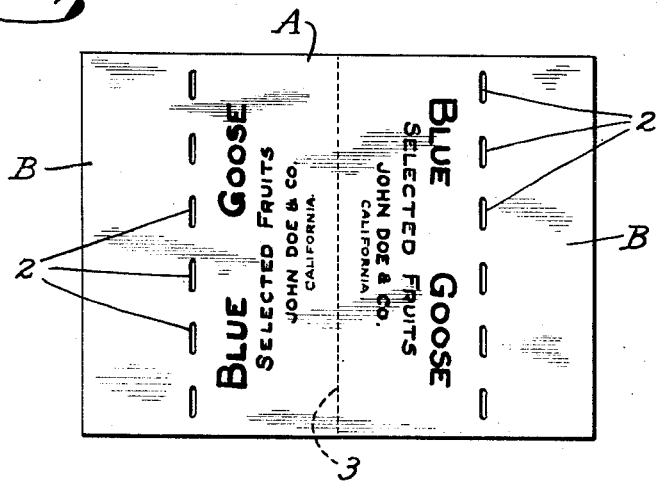
INVENTOR.
John L. Taylor.
BY
Townsend & Loftus
ATTORNEYS.

Patented Feb. 19, 1935

UNITED STATES PATENT OFFICE 1,991,640

FRUIT CURTAIN

John L. Taylor, Stockton, Calif., assignor to Zellerbach Paper Company, San Francisco, Calif., a corporation of California Application July 3, 1933, Serial No. 678,915

1 Claim. (Cl. 217—3)

This invention relates to a fruit curtain or paper covering for fruit which is packed in crates, small boxes, and like containers, and especially to a covering of the character described which is adapted to protect the fruit against dust and exposure and which will at the same time permit display of advertising matter such as a trademark, the name and address of the packer, etc.

The object of the present invention is to generally improve and simplify the packing of fruit in crates and like containers; to provide a cover or curtain of the character described which will permit packing of soft tree fruits, such as prunes, apricots, nectarines, etc., in crates and like containers; which will promote the speed of packing; improve sanitation by covering the fruit; which will eliminate the use of other packing materials; which will serve as a display for advertising and similar matter; and further, to provide a covering which may be quickly opened to permit inspection or display of the fruit and which may be replaced after inspection.

The invention is shown by way of illustration in the accompanying drawing, in which—

Fig. 1 is a perspective of a crate packed with fruit, said view showing the position of the fruit curtain when applied.

Fig. 2 is a plan view of the fruit curtain.

Referring to the drawing in detail, and particularly Fig. 2, it will be noted that the fruit curtain comprises a sheet of paper, or similar material, which consists of a central or cover section generally indicated at A and a pair of connected side sections B—B, the line of division between the central and side sections being formed by a series of elongated slots or openings 2—2 which are provided for ventilating purposes, as will hereinafter be described. The central or cover section is provided with a weakened portion to form a tear line, this being accomplished by perforating the paper as indicated at 3. The perforations form a central line extending longitudinally of the sheet from end to end thereof. This line may be ripped or torn and as such separates the central section into two sheets a—a which may be spread apart for purposes of display or inspection.

In actual use the crates or containers to be packed are made ready by applying the covers. The crates with the covers applied are delivered to the fruit packers who place the curtains therein with the central section registering with the cover and the side sections B—B folded outwardly against the sides of the crate. Selected fruit to form the first or upper layer is then placed in position and the remaining fruit on top thereof, after which the bottoms are nailed down. The crates are then reversed to bring the covers uppermost and in this condition the crates are ready for shipment and sale.

Upon arrival at the destination the covers, usually wooden slats, are removed and the central tear line 3 is ripped, as shown in Fig. 1, thereby permitting the curtain to be lifted or folded outwardly so as to permit inspection or display of the fruit, and it also permits the sections a—a to be folded back to protect and cover the fruit.

A curtain of this character eliminates the use of other packing material, such as pads, liners, and the like, as the curtain forms an intermediate layer between the top and the sides of the crate, thus protecting the fruit against dust and contact with the crate. It permits speed in packing, it improves sanitation by covering the fruit, thus excluding dust and other foreign matter, and it permits the application of advertising matter such as a trade-mark, the name of the packer, address, etc. The elongated openings 2—2 formed between the central section of the curtain and the side sections permit free ventilation or circulation of air through the crates and the keeping qualities are thus improved. The ripping of the tear line 3 is accomplished by the mere insertion of a pencil, or the like, and if the fruit is to be inspected only, only a portion of the tear line may be ripped, as shown in Fig. 1, but if it is desired to display the fruit the central sheet may be completely torn or separated thus permitting folding of the sections a—a outwardly over the sides of the box. This improves the appearance of the box and permits display of advertising matter and also displays the fruit to better advantage.

While certain features of the present invention are more or less specifically described, I wish it understood that various changes may be resorted to within the scope of the appended claims. Similarly, that the materials and finish of the several parts employed may be such as the manufacturer may decide, or varying conditions or uses may demand.

Having thus described my invention, what I claim and desire to secure by Letters Patent is—

A temporary closure for a box of fruit comprising a flimsy sheet of paper adapted to be placed between the cover and the fruit packed in a box, said sheet of paper having a central tear line formed therein extending from end to end of the box, said tear line dividing the sheet into two sections and each section adapted to carry advertising matter, a side section connected to each side of the sheet and adapted to be placed between the sides of the box and the fruit packed therein, and a plurality of elongated ventilating openings formed in the sheet adjacent each side section.

JOHN L. TAYLOR.